W. A. Terry,

Clock Calender.

No. 4,213. Reissued Dec. 20. 1870.

Witnesses.

C. A. Shepard.

Nathan Shepard

Inventor.

William A. Terry,

By James Shepard

Atty.

N. PETERS, PHOTO-LITHOGRAPHER, WASHINGTON, D. C.

United States Patent Office.

WILLIAM A. TERRY, OF BRISTOL, CONNECTICUT.

Letters Patent No. 79,026, dated June 16, 1868; reissue No. 4,213, dated December 20, 1870.

IMPROVEMENT IN CALENDAR CLOCKS.

The Schedule referred to in these Letters Patent and making part of the same.

I, WILLIAM A. TERRY, of Bristol, in the county of Hartford and State of Connecticut, have invented a new and useful Improvement in Calendars for Clocks, of which the following is a specification.

The object of my invention is to make a calendar to be attached to clocks, which shall be more simple, durable and economical than those now in use, and be more easily set and regulated when the clock has been stopped from any cause.

My invention consists in arranging on one arbor or common axis two wheels, one of which has thirty-two teeth, and the other forty-eight; or, if desired to make the calendar for one year only, it has twelve, in such a manner that the relative change of one tooth or division in said wheels shall be made at the end of each month.

It also consists in attaching an index or pointer to the month-wheel, which revolves with it, and indicates the days of the month by suitable figures upon the dial, and in attaching a circular disk, marked with the months of the year and for a perpetual calendar, with leap-year; and the three years immediately succeeding said year, to the year wheel, so that the differential movement between the wheels shall indicate the successive months and also the year relative to leap-year.

It also consists in the peculiar mechanism for regulating the movement of the month-wheel, so that the index shall register the proper number of days in each month, and complete one full revolution in each month without regard to to the number of days in it.

This peculiar mechanism consists in part of the pawl hereinafter described, and of the arrangement of the year-wheel in this particular combination upon a stationary axis, so that the changes of the year-wheel which operate the indicator shall take place between the last day of one month and the first day of the next month.

It also consists in the employment of one or more extra teeth, in addition to thirty-one in the month-wheel, in combination with the mechanism for moving said month-wheel forward at the end of the months.

In the accompanying drawing—

Figure 1:
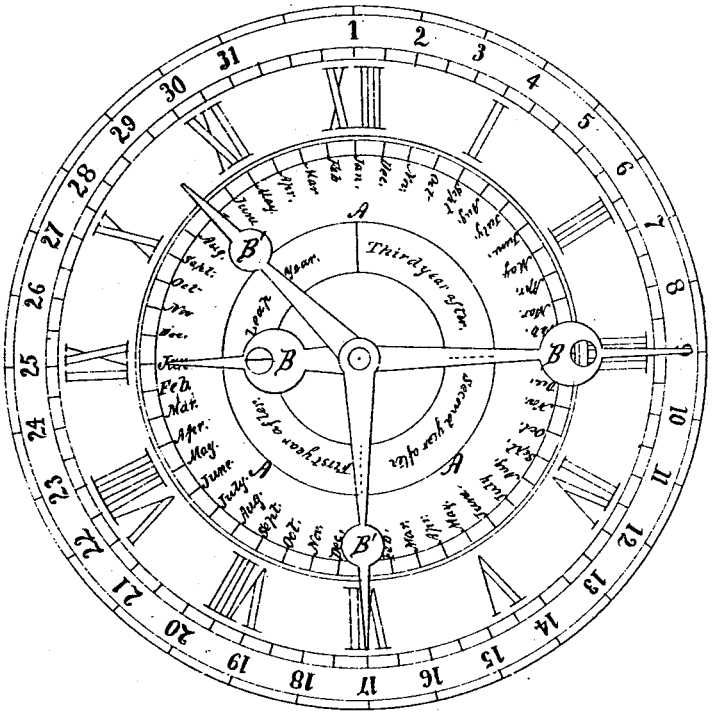

Figure 1 shows the calendar as it appears on the face of the clock.

Figure 2:
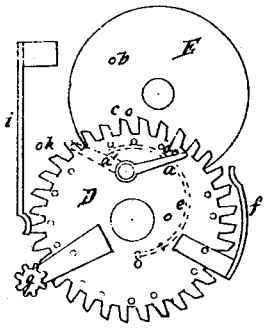
Figure 3:
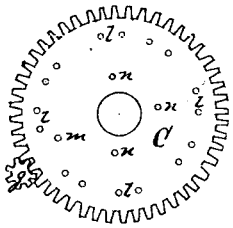

Figures 2 and 3, the parts of the mechanism of the calendar separated from the dial and index.

Figure 4:
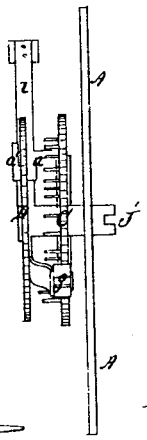
Figure 4:
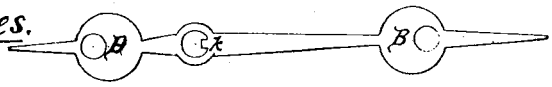

Figure 4, an edge view of the mechanism of the calendar; and

Figure 5, together with fig. 4, the manner in which the index of the calendar is secured to the socket.

A is the disk, attached to the year-wheel C, or set firmly on the same arbor on which are marked the months of the year.

This is shown in the drawing as marked for four years, with forty-eight months, leap-year, and the first, second, and third year after.

B is the index or pointer attached to the arbor of month-wheel D, which passes through that of the year-wheel.

The relative position of these wheels and the disk is shown in fig. 4.

In figs. 2 and 3 the wheel C is shown removed from the top of the wheel D, so as to show the parts more clearly.

E is a twenty-four hour wheel, forming part of or attached to the clock movement.

This has upon it two pins, *b* and *c*, for moving and operating the calendar.

The pin *c* engages with and moves forward one tooth of the wheel D at each revolution of E.

The pin *b* is shorter than *c*, and passes under the wheel D, and engages with the pawl *a'* when the revolution of D brings it to the proper position.

*a a'* is a pawl or dog with one arm, *a*, on one side of the wheel D, and the other, *a'*, on the opposite side, connected together by an axis passing through the the wheel.

This pawl or dog is for the purpose of taking up and passing over the extra teeth in the wheel D for months having less than thirty-one days.

It also serves to take up the thirty-second tooth of the month-wheel while the index changes for the next month.

The wheel D has thirty-two teeth, for the purpose of causing the differential movement of the wheels D and C to take place while the pawl is held in the proper position, and if the wheel C has but twelve teeth, to give time and space for this movement between the last day of one month and the first day of the succeeding month.

One extra tooth, in addition to thirty-one, is all that is necessary to accomplish this result; but the same result can be obtained with more than one extra tooth, if desired.

The wheel C is provided with a number of pins, *l*, *m*, *n*, &c., placed in such positions that, at the end of each month, before one having less than thirty-one days, the pawl *a a'*, when released from the pin *b*, shall have its end *a* fall against the proper one of them to regulate the position of the pawl, so that it shall be taken up by the pin *b* at the proper time to give the right number of days in the following month.

There is one of these pins for each month in the four years that has less than thirty-one days.

Those on the circle *l* are for the thirty-day months.

The one, *m*, nearer the center, is for the month of February in leap-year, and the three others, *n*, are for the month of February in the other three years.

The position of these pins over the wheel D is shown by the small red circles in fig. 2.

*g* is a pinion, carried round upon an arm attached to the wheel D, and gearing into the wheel C. This pinion, at each revolution of D, engages with the pin

*h*, and moves the wheel C forward one tooth upon the wheel D.

With the exception of this differential movement at the end of each month, the wheels D and C revolve together.

*f* is a spring, one end of which is attached to the wheel D, and the other presses upon the teeth of C, in order to keep the wheels together, except when moved by the pin *h*.

*i* is a spring, one end of which is secured to the clock-frame, and the other presses against the teeth of the wheel D to keep it in its position when not operated upon by the pins *b* or *c*.

The axis upon which the wheel D is fixed works inside of that of the wheel C, and inside of both are the arbors for the hands of the clock B′ B′.

To attach the index or pointer firmly to the socket, forming the axis of D, it has a male projection or key, *k*, which fits into a slot, *j*, cut in the socket.

The operation of my invention is as follows:

The wheel E, in revolving, moves the month-wheel D one tooth each day, by means of the pin *c*, until it comes to the end of the month, when the pin *b* takes up the extra teeth and brings the month-wheel again to its starting point.

When the month has thirty-one days, the pawl *a* falls against the stop *d* at the end of the previous month, in which position the end *a′* is taken up by the pin *b* at the end of the thirty-first revolution of E, and carried forward against the spring *e* till the end *a* strikes against the axis on which the wheels turn, or the arm *a′* may strike a pin or other suitable stop on wheel D, when the pawl stops, and the pin *b* carries the wheel D over the thirty-second tooth at the same time that the pin *h* engages one of the leaves of the pinion *g*, and moves the year-wheel one tooth forward.

If the next month has thirty days, the end *a* of the pawl is left resting under one of the pins in the circle *l*, which is placed in the proper position to receive it and raise the end *a′* so that it shall be one tooth in advance of where it was before.

This causes the pawl to be taken up by the pin *b* one revolution of E sooner than before, and the index passes over two teeth at once by means of the pawl, instead of one, as before.

The year-wheel is also moved one tooth as the pinion *g* passes the pin *h*.

When the month has twenty-nine or twenty-eight days the end *a′* of the pawl is raised the proper number of teeth higher, so as to carry the wheel D over the extra teeth by being caught by the pin *b* so many revolutions of E sooner.

By means of this arrangement the month always commences at the same point of the wheel D, and brings the index to the figure 1 upon the dial.

The differential movement of the two wheels D and C takes place while the index is moving from the blank space after the 31 to the point marked 1, so that the pawl is always left in the proper position to be taken up by the pin *b* at the end of the month.

If desired the wheel C can be made with twelve teeth and five pins for the short months in the year, and revolve upon the wheel D once in twelve months instead of forty-eight.

In this case the dial A will be marked with twelve months instead of forty-eight, and if desired to use this arrangement for a perpetual calendar the leap-year index and its proper mechanism can be arranged separately.

The pawl *a a′* can also be made to work upon the under side of wheel D, and have the part that rests upon the pins *l m n*, &c., project through an aperture in the wheel.

In order to set the calendar after the clock has been stopped, all that is necessary is to set the long arm of the index upon the day of the month and turn the month-dial, attached to the year-wheel, round until the proper month of the proper year relative to leap-year comes under the short arm of the index, or, by merely turning the month indicator either forward or backward until the proper month of the proper year relative to leap-year comes under the short arm of the index, stopping the same with the long arm over the proper day of the month. The calendar will then go on correctly to the end of the month, and, if it has thirty-one days, will pass on to the next month correctly.

If, however, it be a short month, the index will have to be moved forward from the last day of the month to the first of the next or the same number of days upon the dial at any time thereafter, when the calendar will continue on correctly as long as the clock runs.

The reason of this is that, after turning round the wheels C and D, the pawl does not rest upon any of the pins and the month registers thirty-one days, as before described.

If in any short month it is desired to set the calendar so that it will continue correctly thereafter, the index can be set to the last day of the preceding month and the clock turned forward twenty-four hours, when the pointer can be moved till the index arrives at the proper day. This will leave the pawl in the right position at the end of the month.

It will be observed that the index cannot be moved at or near twelve o'clock at night, as at that time the the pin *c* is engaged with the teeth of wheel D and prevents its movement. The hands of the clock are so placed that the calendar changes at twelve midnight.

My improved calendar can be attached to the dial of a clock, the wheels turning upon the same center as the hands, as in the drawing, or it may be placed at any other part of the clock-case and operated by a wheel similar to E, or by a rod having pins upon it to perform the same functions as *b* and *c*.

As arranged the leap-year dial is indicated upon the same dial as the months of the year, but for the purpose of merely showing the year relative to leap-year, and thereby enabling the calendar to be set in the proper year. This dial might be arranged by itself with any proper index or pointer, when the same result would be accomplished. Instead of making this dial "leap-year," "first," "second," and "third year after," the same might be indicated by 1 2 3 4.

The end of the pawl *a*, instead of working against pins in the wheel C, can be made to enter into slots or grooves cut in that wheel, and can also, if desired, be made to follow against whatever kind of stops may be used, so that, wherever the calendar may be set, whether the month has thirty-one days or less, it will continue to indicate correctly as long as the clock runs.

My invention can also be so arranged that it can be used with a system of revolving disks, marked with the names of the months and days, so that the number of the day and the name of the month shall show through openings in the face or other part of the clock.

The advantages of my invention are that it has much less machinery, is more simple, and less liable to get out of order than calendars now in use; that it can be used on the same center as the hands of the clock, and applied to clocks of small size, which is not the case with others; that it can be easily regulated and set; that it indicates the year relative to leap-year, so that the calendar may be set for the right year without necessitating the turning of the calendar mechanism through the other years that may intervene; that it may be set by simply turning the indicators to the right position; that the indicators may be turned either forward or backward indifferently and indefinitely without damaging or disarranging the calendar; and that it runs correctly in whatever position it may be started, obviating the most serious objection to the use of other calendars—that they require a skilled mechanic to keep them in order and set them when the clock stops.

I claim as my invention—

1. The month-wheel D, constructed with an extra tooth in addition to thirty-one, as described, in combination with the operating mechanism which moves the month-wheel D forward at the end of the months, for the purpose of moving said wheel over a space equal to two or more of its teeth at the end of every month, substantially as described.

2. The arrangement of the pin *h* and pinion *g*, or their equivalents, in relation to the wheels D C, revolving together as described, so that the differential movement between the wheels shall take place at the end of each month, as herein specified.

3. The combination of the disk A with the wheel C, pins *b* and *c*, the pawl *a a'*, the stops *d l m n*, &c., the wheel D, the pinion *g* or its equivalent, and the pin *h*, constructed and operating substantially as described.

4. The combination of the disk A (having the months of the year marked thereon) and the pointer B, combined and operating together within a circle of figures representing the days of the months, so that the same pointer shall indicate the month and the day of the month, substantially as described.

5. The combination of the pin *b*, or its equivalent, with the dog or pawl *a a'*, the stops *d l m n*, &c., and the wheels D and C, each revolving upon a stationary axis and all operating together, substantially as described.

6. The combination of the parts named in claim 5, pinion *g*, and pin *h*, whereby the changes of the wheel C, which operates the month indicator, shall take place between the last day of one month and the first day of the next month, substantially as described.

7. The combination of a leap-year indicator, and its operating mechanism, with a clock-calendar movement, combined and operating together substantially as described, so that the elative position of the parts of said operating mechanism is indicated upon the dial by indicating the year relative to leap-year, for the purpose of more conveniently setting the calendar, as herein described.

WILLIAM A. TERRY.

Witnesses:

C. A. SHEPARD,
JAMES SHEPARD.